June 12, 1951      R. A. ARTHUR      2,556,159

REGULATOR RATE OF CHANGE MECHANISM

Filed Feb. 24, 1949      2 Sheets-Sheet 1

INVENTOR.
ROBERT A. ARTHUR
BY
ATTORNEY

June 12, 1951 R. A. ARTHUR 2,556,159
REGULATOR RATE OF CHANGE MECHANISM
Filed Feb. 24, 1949 2 Sheets-Sheet 2
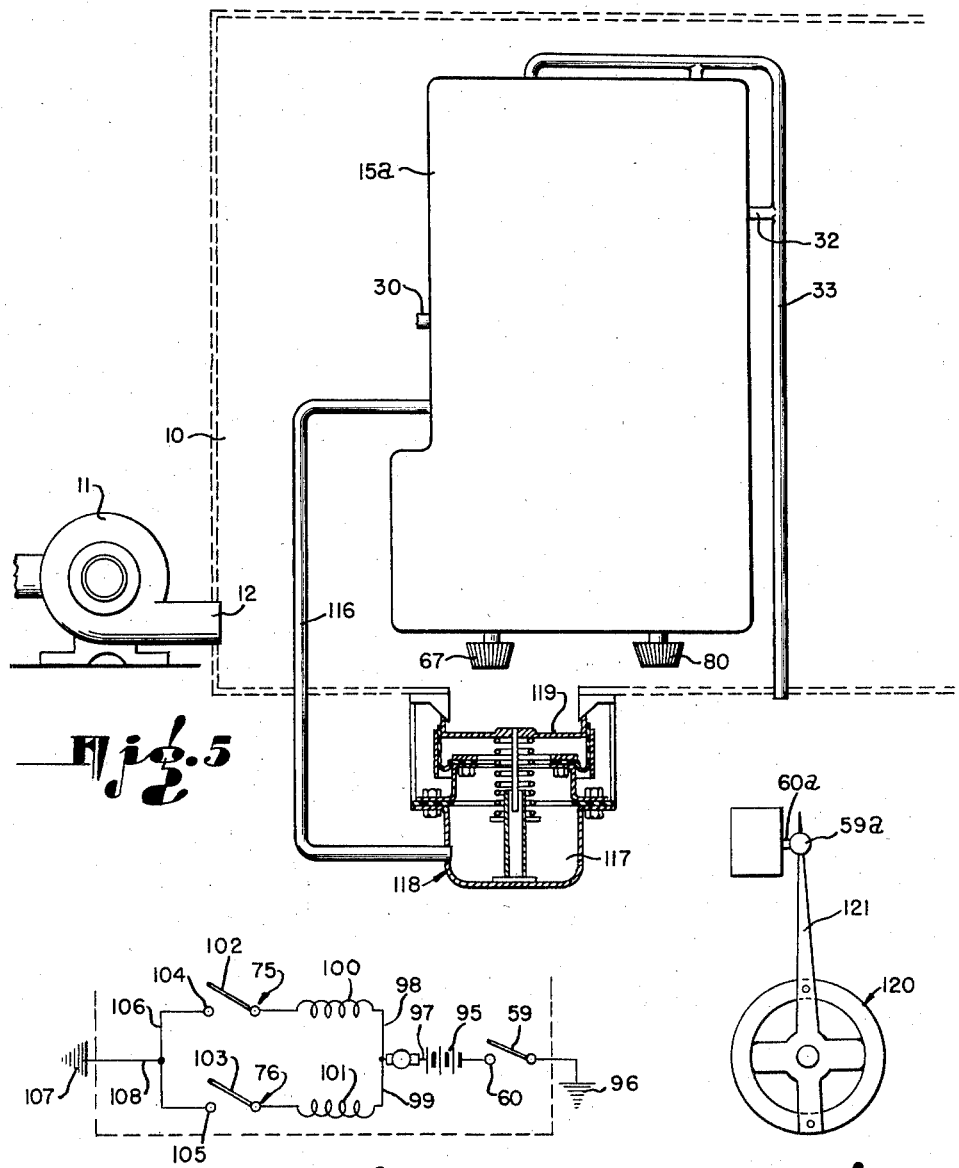
INVENTOR.
ROBERT A. ARTHUR
BY
ATTORNEY Patented June 12, 1951

2,556,159

UNITED STATES PATENT OFFICE 2,556,159

REGULATOR RATE OF CHANGE MECHANISM

Robert A. Arthur, Culver City, Calif., assignor to The Garrett Corporation, Los Angeles, Calif., a corporation of California Application February 24, 1949, Serial No. 78,196

20 Claims. (Cl. 98—1.5)

This invention relates generally to means for controlling the pressurized ventilation of an enclosure, and relates more particularly to means for maintaining a desired air pressure within the enclosure.

While the invention has particular utility in connection with pressurized aircraft cabins and the like, and is shown and described embodied in such an installation, it is to be understood that its utility is not confined thereto.

It is sometimes highly desirable to produce a gradual change in the air pressure within an aircraft during its flight from one altitude to another, as from a lower altitude airport to a higher one, or vice versa, and it is therefore an object of the present invention to provide improved means by which the air pressure within a cabin or enclosure may be automatically changed at a predetermined rate, regardless of the rate of change in ambient atmospheric pressure. Thus, discomfort or harm to the occupants of the aircraft is avoided.

It is another object of the present invention to provide means of this character whereby the pressure within an aircraft cabin may be changed at a gradual preselected rate during flight so that it will have reached a value substantially that of the ambient atmospheric pressure at the terminal airport. Thus, upon landing at an airport situated at a higher or lower altitude than at the starting point of the flight, the occupant or occupants of the craft will find the atmospheric pressure at the terminal airport substantially the same as that within the aircraft when it lands at said terminal airport, thus avoiding any sudden and uncomfortable pressure change at said airport when landing and leaving the aircraft.

It is a further object to control the pressure in pressurized cabins in such manner as will permit the selection of a desired pressure to be attained within the cabin and also a desired rate of pressure change within the cabin whereby changes in pressure to which occupants of the cabin are subjected will not be so abrupt or rapid as to cause discomfort.

Let it be supposed that an aircraft upon leaving an airport at one altitude is to land at a field of different altitude within a given period of time. The occupants of the cabin are subjected to a pressure change, produced gradually, so that when the second landing field is reached, the pressure to which the occupants are subjected within the aircraft cabin will correspond to the atmospheric pressure at the second landing field. During the flight from the first field to the second field, although the aircraft may rise to an altitude considerably above the altitude of either landing field, the occupants of the pressurized cabin will not be conscious of this fact, but will be subjected to a reduced pressure no greater than that corresponding to the altitude of the highest of the two landing fields.

Another object of the invention is to provide a device of this character which is more accurate in controlling the rate of change.

Still another object of the invention is to provide a device of this character which actually governs the speed of the motor effecting the rate of change.

A further object of the invention is to provide a device of this character which substantially eliminates speed variations in the operation of the electrical motor operating the rate of change mechanism due to voltage variations, variations in temperature, friction, et cetera.

A still further object of the invention is to provide a control mechanism of this character which can be mounted at the aircraft instrument panel.

Another object of the invention is to provide a device of this character that is relatively simple in construction and reliable in operation.

Other objects and advantages of the invention will appear from the following part of the specification.

Referring to the drawings, which are for illustrative purposes only,

Fig. 4 is a schematic wiring diagram of the electrical circuit of the present device;

Fig. 5 is a schematic view of an alternative arrangement; and

Fig. 6 is a partial schematic view of an alternative rate of change switch mechanism.

Figure 1:
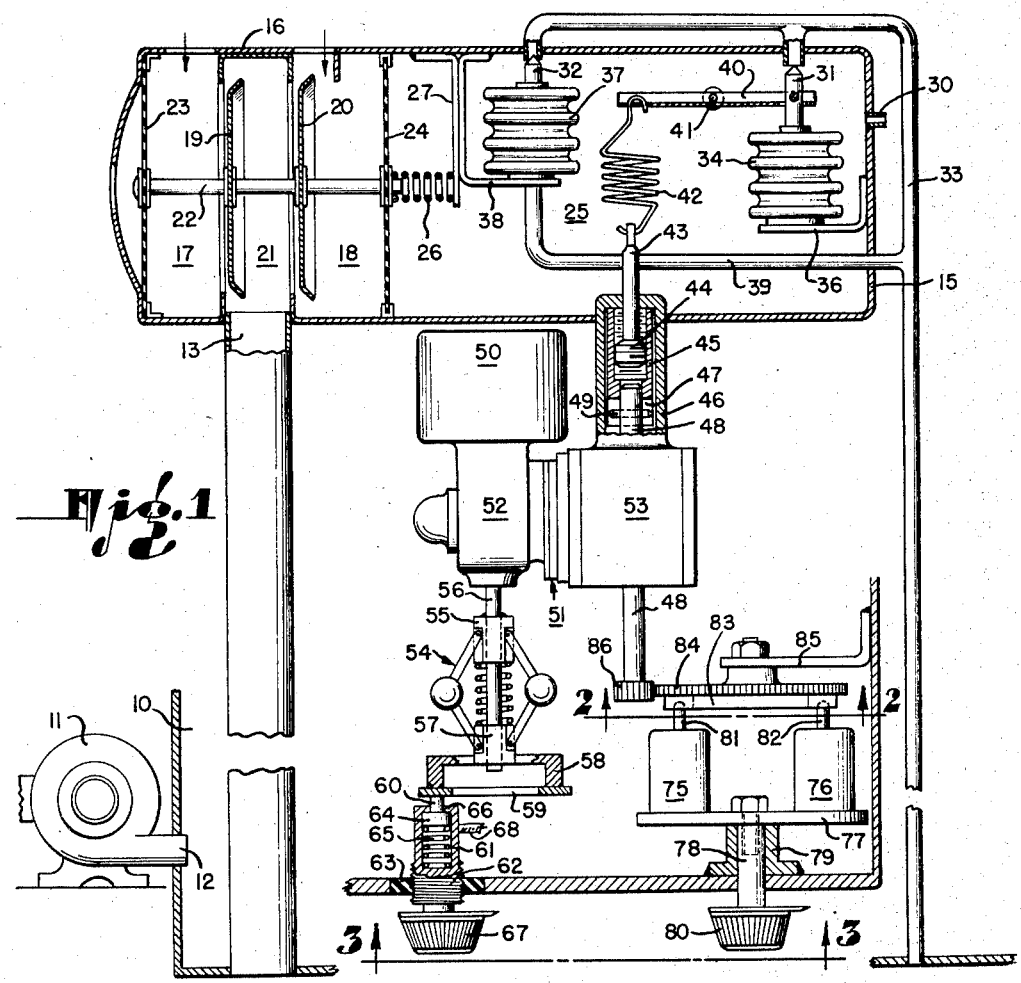
Fig. 1 is a schematic sectional view of mechanism for controlling the pressure in an enclosure embodying the present invention.
Figure 2:
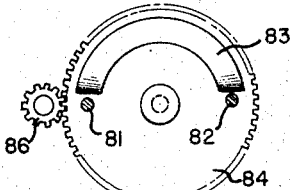
Fig. 2 is a sectional view taken on line 2—2 of Fig. 1.

Referring to Fig. 1, there is shown an aircraft cabin pressurizing arrangement in which air under pressure is delivered to the cabin 10 by a supercharger, conventionally indicated at 11, through an inlet 12, and the pressure within the cabin 10 is controlled by controlling the escape of air from the cabin through an outlet 13 by means of a regulator unit embodying the present invention.

The regulator shown in Fig. 1 includes a housing 15 having a portion 16 provided with a pair of spaced chambers 17 and 18 which provide parallel paths for the flow of air from the cabin past balanced valves 19 and 20 into an intermediate chamber 21 from which it may escape to atmosphere through the outlet passage 13. The valves 19 and 20 are mounted on a shaft 22 having one end connected to a flexible supporting member or diaphragm 23, and having the opposite end secured to a pressure sensitive element or diaphragm 24 which is subjected on one side to cabin pressure and on the opposite side to pressure within the housing 15 which defines a control pressure chamber 25. The valves 19 and 20 are thus balanced and are urged in the closing direction by a spring 26 which reacts between the diaphragm 24 and a bracket 27 secured to one wall of the housing and thus in effect being a fixed support. The spring 26 supplements the pressure in the control chamber 25 urging the diaphragm 24 in the valve closing direction in opposition to the cabin pressure exerted on the opposite side of said diaphragm which responds to variations in the differential of pressure on opposite sides thereof.

Air is bled into the control chamber 25 through a restricted calibrated connection 30 between said control chamber and the cabin, which comprises a source of higher pressure. The pressure in the control chamber 25 is determined by controlling pilot valves 31 and 32, said pilot valves being adapted to bleed excess pressure from the chamber 25 through a conduit 33 which leads to atmosphere.

The valve 31 is controlled by a pressure responsive device or evacuated bellows 34 having one end connected to said valve 31 and the opposite end secured to a fixed support comprising a bracket 36 attached to an adjacent part of the housing 15. The valve 32 is controlled by a differential pressure responsive device shown as a bellows 37, having one end connected to the valve 32 and having the opposite end attached to a fixed support shown as a bracket 38 secured to a wall of the housing 15. The bellows 37 has its interior connected with atmosphere by means of a conduit 39 which connects with the conduit 33. The differential pressure responsive bellows is adapted to control the pressure in the control chamber in accordance with the differential of pressure between that in said control chamber and atmosphere, in the manner described in the application of James M. Kemper for Cabin Pressure Regulator, Serial No. 556,790, filed October 2, 1944, now Patent No. 2,463,491, issued March 1, 1949.

Means for modifying the response of the pressure responsive device or bellows 34 comprises, as shown herein, a lever 40 pivotally connected adjacent one end to the valve 31. The lever 40 is pivotally mounted intermediate its ends by means of a pivotal member 41. A spring 42 has one end connected to the opposite end of the lever 40, the opposite end of said spring being connected to a shank 43 having a screw 44 disposed within a sleeve-like nut 45. The screw is adapted to move axially but is held against rotation, said screw and nut arrangement being of similar character to that shown and described in the Kemper application for Cabin Pressure Control System, Serial No. 613,794, filed on August 31, 1945, now Patent No. 2,463,489, issued March 1, 1949.

The nut 45 is rotatably mounted within a sleeve 46, supported by a wall of the housing 15, and is provided with a slot 47 in its lower end, as shown in Fig. 1. The nut 45 receives a shaft 48 therein, having a cross pin 49 which engages the sides of the slot 47 to effect rotation of the nut 45. The shaft 48 is rotated by a reversible electric motor 50 through a speed reducing gear box, indicated generally at 51. The gear box includes a portion 52 and a portion 53, said shaft 48 extending from the portion 53 of said gear box.

Means is provided for controlling the speed of the motor, and hence, the speed of the shaft 48, so as to control the change in the tension of spring 42, and thereby control the response of the bellows 34, and hence control the rate of change of pressure in the chamber 25. The means for controlling the speed of the motor includes a governor mechanism shown herein as a flyball governor 54, having one end 55 attached to the shaft 56 of the motor 50. The opposite end of the governor 54 is provided with a sleeve 57 slidable axially on the shaft 56 and urged outwardly toward the free end of said shaft or downwardly, as shown in Fig. 1. The sleeve 57 is part of a switch contact comprising an annular member 58 carrying an annular contact member 59. The contact ring 59 is adapted to make and break contact with a contact member 60 mounted in a sleeve 61 having a threaded end 62 which is screwed into an insulating member 63 secured in a convenient, fixed wall or support. The lower end of the contact 60 is enlarged at 64, and a spring 65 urges said contact member 60 outwardly of an opening in the end wall 66 of the sleeve 61, said enlarged portion 64 abutting against the inner side of said end wall 66. A knob 67 of insulating material or the like, is provided on the sleeve 61 for rotating same and thereby varying the position of the contact 60 with respect to the contact ring 59, and thus varying the governed speed of the motor 50. There is an electrical connection or wire 68 connected to the sleeve 61. The complete electrical circuits will be described hereinafter.

There is also means for presetting the mechanism for any desired pressure to be attained within the control chamber 25, and hence, in the cabin, in other words, an altitude selector. This means comprises a pair of electrical switches 75 and 76 respectively, which are mounted on opposite sides of a rotatable supporting plate 77 mounted to one end of a shaft 78, rotatable in a bearing 79 secured to a convenient, fixed wall. The shaft 78 extends through the housing wall and is provided with a knob 80 adjacent its outer end. The switches 75 and 76 are provided with switch actuating plungers 81 and 82 respectively, the free ends of said switches being in substantially the same plane when inoperative, and said plungers are adapted to be actuated by an arcuate cam 83 on a large gear 84 rotatably secured to a bracket 85 attached to a convenient, fixed wall. The gear 84 is driven by a small gear 86 attached to the shaft 48 adjacent the end thereof opposite the end which is received in the nut 45. The cam 83 is less than 180° in extent, so that when the gear 84 is in a neutral position the switch plungers 81 and 82 are both fully extended and the switches thereof are open.

In Fig. 4 there is schematically shown a wiring diagram for the present arrangement, there being a source of power, shown as a battery 95, having one side connected to the contact 60 of the governor controlled switch. The annular contact member is grounded, said ground being shown at 96 in Fig. 4. The other side of the battery 95 has a wire connection 97 with branches 98 and 99, wire 98 being connected to one end of a motor winding 100 which effects operation of the motor in a direction to effect an increase in control chamber pressure. The wire 99 is connected to one end of the motor winding 101 which operates the motor in a direction to effect reduction in the pressure in control chamber 25. The opposite side of the winding 100 is connected to the movable switch member 102 of switch 75, while the opposite end of winding 101 is connected to the movable switch member 103 of switch 76. Switches 75 and 76 have fixed terminals 104 and 105 respectively, which are interconnected by a wire 106, and the latter is grounded at 107 through a wire 108.

The above wiring arrangement is an example of one way in which the various circuits may be formed and controlled.

Before describing in detail the operation of the rate of change mechanism it will be pointed out that the diaphragm 24, which controls the outflow valves 19 and 20, responds to differentials of pressure arising between substantially cabin pressure which is exerted against its left side (as viewed in Fig. 1), and the pressure of air in the control chamber 25, supplemented by the force of the spring 26 exerted against its right side. Any tendency of cabin pressure to drop below the level determined by the pressure in the control chamber 25 will result in movement of the diaphragm 24 in valve closing direction, thus causing the cabin pressure to rise to the proper level. Conversely, any excess cabin pressure will result in valve opening movement, permitting cabin pressure to drop back to the level determined by the pressure in the control chamber 25.

The pressure in the control chamber 25 is determined and controlled by the pilot valves 31 and 32 which are adapted to bleed excess pressure from chamber 25 in accordance with the response of the pressure responsive elements 34 and 37 to the pressures to which they are subjected.

The absolute pressure responsive bellows 34 normally controls the operation of the regulator. It is adapted to undergo a gradual change of setting (effected by shifting one end of the spring 42) and to bring about a corresponding change in the level at which the cabin pressure is maintained. The extent to which cabin pressure is changed depends upon the extent to which the loading of spring 42 is changed. The rate at which cabin pressure is changed is governed by the rate at which the loading of the spring 42 is changed. Since the bellows or aneroid 34 is unaffected by ambient atmospheric pressure, this change in cabin pressure will be independent of changes in ambient pressure, within the normal range of operation of the regulator. However, in order to protect the cabin structure against damage from an excessively high differential between cabin and ambient atmospheric pressure, the differential pressure responsive pilot valve 32 (which remains closed during the normal range of operation governed by the pilot valve 31) will override the pilot valve 31 and establish a limit upon the pressure differential, above which it will not permit the differential to increase.

As previously stated, the pressure level in the cabin is changed by changing the position of the adjustable end of the spring 42. This adjustment changes the spring load which is imposed upon the lever 40. This spring load, exerted in valve closing direction, is balanced against the loading of the evacuated bellows 34 by the pressure within the control chamber 25 exerted against the exterior of the bellows 34. As the tension of the spring 42 is increased, a corresponding increase in pressure in the chamber 25 is necessary in order to maintain the balance between the opposing forces. Consequently, the increase in tension in the spring 42 will cause a corresponding increase in pressure in the chamber 25 (since the pilot valve 31 can open to relieve the pressure in the chamber 25 only when the pressure against the bellows 34 overcomes the pull of the spring 42, and there is a constant tendency for the pressure in the chamber 25 to increase because of the fact that the supercharging apparatus tends to constantly build up the pressure in the cabin, and a head in the cabin pressure over the pressure in the chamber 25 is thus maintained owing to the restriction of the bleed orifice 30). When the pressure in the chamber 25 changes, as the result of adjustment of the spring 42, cabin pressure will change in step therewith.

Referring now to the mechanism for varying the tension of the spring 42, it is to be understood that the rate at which said spring tension is changed may be preset by rotating the knob 67 to the desired rate, as indicated on a dial 110. The contact 60 will then be so located with respect to the annular contact 59 as to provide the desired motor speed. It will be noted that in making the adjustment of the sleeve 61, effected by turning the knob 67, the contact 60 may be moved inwardly of the sleeve against the opposition of the spring 65. As the motor 50 operates, the annular contact 59 will move upwardly (as shown in Fig. 1), and the contact 60 will follow said contact 59 until the enlarged portion 64 engages the wall 66 of the sleeve. At this time further movement of the contact 60, in the upper direction, will cease and thereafter the contact 59 will disengage and engage the contact 60 as the motor speed increases or decreases. This disengagement and engagement is effected by the governor 54 according to the speed thereof, and will thus control the speed of the motor and measure the actual speed of said motor, which speed will be maintained substantially constant for a given setting of the knob 67.

Figure 3:
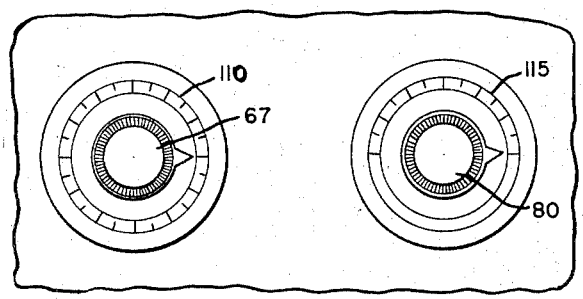
Fig. 3 is a partial view of the panel as seen from line 3—3 of Fig. 1.

The direction of operation of the motor is determined by the setting of the knob 80 of the cabin altitude selector. Assuming the aircraft is starting at a relatively low altitude and the destination airport is at a higher altitude, the knob 80 is turned counterclockwise (Fig. 3) to the altitude reading on the dial 115 corresponding to the altitude of the destination airport. This movement of the knob effects rotation of the plate 77 and switches 75 and 76, causing the plunger 82 of switch 76 to engage the cam 83 and depress the plunger 82. This depression of the plunger 82 effects closing of switch 76 for energizing the winding 101 of the motor 50 which then rotates in a direction to cause screw 44 to move upwardly (Fig. 1) and to reduce the tension of the spring 42.

In other words, a gradual decrease in cabin pressure is brought about by the gradual relaxing of the tension in the spring 42, permitting the pilot valve 31 to open at progressively lower pressures in the control chamber 25, thereby lowering the pressure in the chamber 25 through resultant escape of air therefrom through the conduit 33, and correspondingly lowering the pressure in the cabin.

The rate of change setting is made so that the cabin pressure will be brought to the maximum limit within a desired predetermined period of time. The mechanism will then operate to control the pressure within the control chamber 25, and hence, cabin pressure, so that there will be a gradual change in said pressures at a predetermined rate over a predetermined period of time to a predetermined value.

As the motor operates, the gear 84 and cam 83 will be rotated slowly until the latter is free of the plunger 82 of switch 76, said plunger being moved outwardly by a spring, not shown, thereby opening the switch 76 and stopping operation of the motor. This stopping of the motor will occur when the desired cabin pressure has been reached.

Should the aircraft be flying from a higher to a lower altitude airport, the rate of change and altitude selectors will be adjusted accordingly, and the mechanism will operate in the reverse direction to control the cabin pressure at a predetermined rate over a predetermined period of time, and the motor will be stopped when the desired cabin pressure has been reached.

In Fig. 5 the rate of change and altitude selection mechanism, as well as the pilot valve mechanisms, are enclosed within a housing 15a which may be located at the instrumental panel, and which defines a pressure control chamber. The pressure within the housing 15a is transmitted through a conduit 116 to the control chamber 117 of a valve unit 118, which is separate from the housing, and may be remotely located therefrom. The regulator 118 has a movable valve member 119 which is urged in the opening direction by cabin pressure and in the closing direction by control chamber pressure. This regulator is of the type shown in the application of Arthur et al. for a Regulator, Serial No. 776,842, filed September 29, 1947, now Patent No. 2,531,100, and the details of said regulator need not be described herein.

In Fig. 6 there is shown an alternative rate of change switch which comprises a tachometer mechanism 120, which is operated by the motor 50. When the speed of the motor has increased to a predetermined value, the arm 121 of the tachometer, which carries a movable contact 59a, will move in the clockwise direction, as shown in Fig. 6, so as to move away from the contact 60a to break the circuit to the motor. The motor speed will then decrease until the contact 59a engages the contact 60a, whereupon the motor speed will pick up. As there will be very little movement of the arm 121 under these circumstances, merely enough to make and break the circuit, the speed of the motor will be maintained substantially constant.

I claim:

1. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure, adapted to control the pressure in said control chamber; adjusting means for changing the response of said pressure control means so as to change said control pressure; motor means for actuating said adjusting means; and speed responsive means for controlling the speed of operation of said motor means thereby controlling the rate at which said adjusting means is operated.

2. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure, adapted to control the pressure in said control chamber; adjusting means for changing the response of said pressure control means so as to change said control pressure; motor means for actuating said adjusting means; speed responsive means, responsive to motor speed, for controlling the speed of operation of said motor means; and means for arresting the operation of said motor means when a predetermined adjustment of said pressure control means has been made.

3. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure, adapted to control the pressure in said control chamber; adjusting means for changing the response of said pressure control means so as to change said control pressure; motor means for actuating said adjusting means; and a speed responsive governor operated by said motor means for controlling the speed of operation of said motor means and thereby controlling the rate at which said adjusting means is operated.

4. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure, adapted to control the pressure in said control chamber; adjusting means for changing the response of said pressure control means so as to change said control pressure; motor means for actuating said adjusting means; and a speed responsive governor operated by said motor means for controlling the speed of operation of said motor means and thereby controlling the rate at which said adjusting means is operated; and means for arresting the operation of the motor means when a predetermined adjustment of said pressure control means has been made.

5. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure and adapted to control the pressure in said control chamber; spring means connected to said pressure control means and so arranged that variations in the tension of said spring will change the response of said pressure control means; adjusting means, varying the tension of said spring means; motor means for actuating said adjusting means; and speed responsive means, responsive to the speed of said motor means, for controlling the speed of operation of said motor means and thereby controlling the rate at which said adjusting means is operated.

6. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; absolute pressure control means for said control chamber, including pressure responsive means, having one side subjected to control chamber pressure and adapted to control the pressure in said control chamber; spring means connected to said pressure control means and so arranged that variations in the tension of said spring will change the response of said pressure control means; adjusting means, varying the tension of said spring means; motor means for actuating said adjusting means; and speed responsive means, responsive to the speed of said motor means, for controlling the speed of operation of said motor means and thereby controlling the rate at which said adjusting means is operated.

7. Mechanism for controlling the pressure in an enclosure including: enclosure pressure control means operable to control the pressure in said enclosure, said pressure control means including a pressure sensitive element; a control chamber, said pressure sensitive element being exposed both to cabin pressure and control chamber pressure in such a manner that changes in either of said pressures cause a movement of said pressure sensitive element; pressure control means for said control chamber, including pressure responsive means having one side subjected to control chamber pressure for controlling the pressure in said control chamber; reversible actuating means for adjusting the response of said pressure control means; and presettable speed responsive control means for said actuating means adapted to control the rate at which said actuating means operates.

8. Mechanism for controlling the pressure in an enclosure including: enclosure pressure control means operable to control the pressure in said enclosure, said pressure control means including a pressure sensitive element; a control chamber, said pressure sensitive element being exposed both to cabin pressure and control chamber pressure in such a manner that changes in either of said pressures cause a movement of said pressure sensitive element; pressure control means for said control chamber, including pressure responsive means having one side subjected to control chamber pressure for controlling the pressure in said control chamber; reversible actuating means for adjusting the response of said pressure control means; presettable speed responsive control means for said actuating means adapted to control the rate at which said actuating means operates; and preselected means associated with the actuating means for selecting the direction of change and effecting stopping of the actuating means after the latter has operated a predetermined amount.

9. Mechanism for controlling the pressure in an enclosure including: enclosure pressure control means operable to control the pressure in said enclosure, said pressure control means including a pressure sensitive element; a control chamber, said pressure sensitive element being exposed both to cabin pressure and control chamber pressure in such a manner that changes in either of said pressures cause a movement of said pressure sensitive element; pressure control means for said control chamber, including pressure responsive means having one side subjected to control chamber pressure for controlling the pressure in said control chamber; reversible electric motor means for adjusting the response of said pressure control means; presettable speed responsive control means responsive to the speed of said electric motor means, for said actuating means, adapted to control the rate at which said actuating means operates; and preselecting means associated with said reversible motor means for selecting the direction of change and effecting stopping of said electric motor means after the latter has operated a predetermined amount.

10. Mechanism for controlling the pressure in an enclosure including: enclosure pressure control means operable to control the pressure in said enclosure, said pressure control means including a pressure sensitive element; a control chamber, said pressure sensitive element being exposed both to cabin pressure and control chamber pressure in such a manner that changes in either of said pressures cause a movement of said pressure sensitive element; pressure control means for said control chamber, including pressure responsive means having one side subjected to control chamber pressure for controlling the pressure in said control chamber; reversible motor means for adjusting the response of said pressure control means; and a presettable governor responsive to the speed of said motor means adapted to control the speed of said motor and hence control the rate at which said actuating means operates.

11. Mechanism for controlling the pressure in an enclosure including: enclosure pressure control means operable to control the pressure in said enclosure, said pressure control means including a pressure sensitive element; a control chamber, said pressure sensitive element being exposed both to cabin pressure and control chamber pressure in such a manner that changes in either of said pressures cause a movement of said pressure sensitive element; pressure control means for said control chamber, including pressure responsive means having one side subjected to control chamber pressure for controlling the pressure in said control chamber; reversible motor means for adjusting the response of said pressure control means; electric switch for said motor means; a governor connected to and responsive to the speed of said motor means for controlling the switch and thereby controlling the speed of operation of speed motor; and preselected means associated with the motor means for selecting the direction of operation thereof and effecting stopping of said motor means after the latter has operated a predetermined amount.

12. Mechanism for controlling the pressure in an enclosure including: enclosure pressure control means operable to control the pressure in said enclosure, said pressure control means including a pressure sensitive element; a control chamber, said pressure sensitive element being exposed both to cabin pressure and control chamber pressure in such a manner that changes in either of said pressures cause a movement of said pressure sensitive element; pressure control means for said control chamber, including pressure responsive means having one side subjected to control chamber pressure for controlling the pressure in said control chamber; reversible motor means for adjusting the response of said pressure control means; and a tachometer operated switch responsive to the speed of said motor means for controlling the speed of said motor and thereby controlling the rate at which said actuating means operates.

13. Mechanism for controlling the pressure in an enclosure including: enclosure pressure control means operable to control the pressure in said enclosure, said pressure control means including a pressure sensitive element; a control chamber, said pressure sensitive element being exposed both to cabin pressure and control chamber pressure in such a manner that changes in either of said pressures cause a movement of said pressure sensitive element; pressure control means for said control chamber, including pressure responsive means having one side subjected to control chamber pressure for controlling the pressure in said control chamber; spring means connected with said pressure control means so as to vary the response of said pressure control means in accordance with variations in the tension of said spring; reversible actuating means for adjusting the tension of said spring and thereby adjusting the response of said pressure controlling means; presettable speed responsive control means for said actuating means adapted to control the rate at which said actuating means operates; and preselecting means associated with the actuating means for selecting the direction of change and effecting stopping of the actuating means after the latter has operated a predetermined amount.

14. In mechanism for controlling pressure in an enclosure: enclosure pressure control means operable to control the pressure in said enclosure, said pressure control means including a pressure sensitive element; a control chamber having an inlet passage and an outlet passage, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for controlling one of the control chamber passages and thereby controlling the pressure in said control chamber, said pressure control means including pressure responsive means having one side subjected to control chamber pressure; adjusting means for changing the response of said pressure control means so as to change said control pressure; motor means for actuating said adjusting means; and means responsive to the speed of said motor means for controlling the said motor speed thereby controlling the rate at which said adjusting means is operated.

15. Pressure control mechanism including: means defining a pressure chamber having an inlet passage and an outlet passage; pressure responsive means responsive to said chamber pressure for controlling one of said passages; adjusting means for changing the response of said pressure responsive means; motor means for actuating said adjusting means; and speed responsive means, responsive to the speed of said motor means, for controlling the speed of said motor and thereby controlling the rate at which said adjusting means is operated.

16. Pressure control mechanism, including: means defining a control pressure chamber; means for controlling the pressure in said chamber including pressure responsive means controlling the flow of fluid relative to said chamber; adjusting means for changing the response of said pressure responsive means; motor means for actuating said adjusting means; and speed responsive means, responsive to the speed of said motor means, for controlling the speed of said motor and thereby controlling the rate at which said adjusting means is operated.

17. Pressure control mechanism, including: means defining a pressure chamber; means for controlling the pressure in said chamber, said means including pressure responsive means; means, including motor means, for changing the response of said pressure responsive means; and speed responsive means, responsive to the speed of said motor means, for controlling the speed of said motor and thereby controlling the rate of change of said pressure responsive means.

18. Pressure control mechanism, including: means for defining a pressure chamber; means for controlling the pressure in said chamber; said means including pressure responsive means controlling the flow of fluid relative to said chamber; means, including reversible motor means, for changing the response of said pressure responsive means; a speed responsive governor responsive to the speed of said motor means, for controlling the speed of said motor; and means for controlling the direction of operation of said motor means.

19. Pressure control mechanism, including: means defining a pressure chamber; means for controlling the pressure in said chamber, including pressure responsive means for controlling the flow of fluid relative to said chamber; adjusting means for changing the response of said pressure responsive means; reversible motor means for actuating said adjusting means; speed responsive means, responsive to the speed of said motor means, for controlling the speed of said motor and thereby controlling the rate at which said adjusting means is operated; and means for controlling the direction of operation of said motor means.

20. Pressure control mechanism, including: means defining a pressure chamber; means for controlling the pressure in said chamber, including pressure responsive means for controlling the flow of fluid relative to said chamber; adjusting means for changing the response of said pressure responsive means; reversible motor means for actuating said adjusting means; a speed responsive governor responsive to the speed of said motor means, for controlling the speed of said motor; and means for controlling the direction of operation of said motor means.

ROBERT A. ARTHUR.

REFERENCES CITED

The following references are of record in the file of this patent:

UNITED STATES PATENTS

| Number | Name | Date |
|---|---|---|
| 2,424,491 | Morris | July 22, 1947 |
| 2,450,881 | Cooper et al. | Oct. 12, 1948 |
| 2,463,489 | Kemper | Mar. 1, 1949 |
| 2,463,490 | Kemper | Mar. 1, 1949 |
| 2,465,759 | Sparrow | Mar. 29, 1949 |
| 2,473,776 | Baak | June 21, 1949 |